United States Patent [19]

Fish

[11] Patent Number: 5,146,790
[45] Date of Patent: Sep. 15, 1992

[54] TORQUE SENSOR

[75] Inventor: Gordon E. Fish, Verona, N.J.

[73] Assignee: Allied-Signal Inc., Morris Township, Morris County, N.J.

[21] Appl. No.: 532,484

[22] Filed: Jun. 4, 1990

[51] Int. Cl.$^5$ .............................................. G01L 3/02
[52] U.S. Cl. ............................. 73/862.336; 73/779; 324/209
[58] Field of Search ................... 73/862.36, 779; 324/209

[56] References Cited

U.S. PATENT DOCUMENTS

| | | | |
|---|---|---|---|
| 3,302,456 | 2/1967 | Guerth | 73/862.36 |
| 4,414,855 | 11/1983 | Iwasaki | 73/862.36 |
| 4,523,482 | 6/1985 | Barkhoudarian | 73/862.36 |
| 4,596,150 | 6/1986 | Kuhr | 73/779 |
| 4,931,729 | 6/1990 | Pratt | 73/779 X |

OTHER PUBLICATIONS

Sasada et al., IEEE Trans. Magn. MAG-20, 951 (1984), "Torque Transducers with Stress-Sensitive Amorphous Ribbons of Chevron . . . ".

Primary Examiner—Donald O. Woodiel
Attorney, Agent, or Firm—Ernest D. Buff; Gerhard H. Fuchs

[57] ABSTRACT

Torque in a shaft is measured by a torque sensor comprising at least one strain gage. The strain gage has a magnetic circuit comprising a magnetostrictive, soft ferromagnetic element. A drive mechanism applies a first and a second magnetomotive force to the magnetic circuit. The second magnetomotive force has a sense opposite that of the first magnetomotive force. A sensing mechanism senses the state of magnetization of the ferromagnetic element and a detecting mechanism determines the magnitude of that magnetic field applied to the ferromagnetic element by the second magnetomotive force which reduces the magnetization of the element to zero. Torque is derived from the strain indicated by a change in the coercive field of the ferromagnetic element.

2 Claims, 3 Drawing Sheets

TORQUE SENSOR

BACKGROUND OF THE INVENTION

1. Field of the Invention

This invention relates to a torque sensor and a method for sensing torque using a measurement of strain correlated with the increase in coercive field of certain magnetostrictive, soft ferromagnetic materials upon application of stress.

2. Description of the Prior Art

Measurement of torque is frequently required in the design of industrial machinery. In order to determine critical design parameters within various elements, the designer must be able to measure accurately the mechanical forces, including torque, to which components may be subjected under operating conditions. Measurement of torque is also needed for the efficient operation of certain machines. For example, it may be desired for the sake of efficiency to operate an electric motor at a power level which causes as much torque to be applied to a load as the shaft connecting the motor to the load can tolerate without mechanical failure.

It is known in the art that a cylindrical shaft subjected to a mechanical torque undergoes a deformation which may be analyzed by the stresses therein. More particularly, the stresses in a shaft subjected only to torque are known to be purely tensile in the direction of one of the 45° helices of the shaft, while the other 45° helix, which has opposite chirality or handedness, exhibits purely compressional stress. A 45° helix is defined conventionally as a locus of points of constant radius r from the axis of the cylinder such that points separated by a distance 1 when measured along the axis are at polar angles differing by 45 (1/r) degrees.

Several known sensors for measurement of torque in a cylindrical shaft rely on use of two strain gages adapted for the measurement of strain at the surface of the shaft. One of the strain gages is adapted to measure strain along a first 45° helical direction. The other strain gage is adapted to measure strain along a second 45° helical direction of chirality opposite that of the first 45° helical direction. The torque to which the shaft is subjected may then be determined from the strains thus measured by formulae well known in the art.

A typical sensor of the type described above employs resistive strain gages composed of metal or semiconductor elements. The electrical resistance of such strain gages changes due to the elongation or compression of the active element (typically composed of wire or foil) due to the imparted stress. The resistance is measured using well known electrical circuitry, frequently a Wheatstone bridge technique.

A major problem in use of such torque sensors to measure torque in a rotating shaft is the need to provide electrical connection to the shaft to supply energy to drive the strain gages and to transmit signals indicative of the strain therein. A number of methods have been employed to overcome this difficulty. Slip rings can provide a rotatable electrical connection between a rotating shaft and its fixed surroundings. Slip rings however are a source of electrical noise and are not fully reliable, especially at high rotation rates. Rotable transformers may be used only if AC excitation of the strain gages is acceptable. Generally, resistive strain measurement is less accurate using AC than DC excitation. Another alternative is use of drive circuitry and a telemetry transmitter mounted rigidly on the rotating shaft. Signals indicative of the strain being sensed by the strain gages are transmitted by radio from the shaft to external receiving means. Such circuitry is relatively bulky and complex.

A torque transducer employing stress-sensitive amorphous ribbon is disclosed by I. Sasada et al. (IEEE Trans. Magn. *MAG*-20, 951 (1984)). The transducer relies on a combination of shape anisotropy and anisotropy resulting from bending an amorphous ribbon around a shaft. An exciting coil and two sensing coils are used for the measurement of magnetic susceptibility (or equivalently of magnetic permeability) of two ribbons applied along +45° and −45° axes, the angles measured between the longitudinal direction of each ribbon and the shaft axis. The dynamic range is disclosed to be longer than 20 N-m for a 12 mm shaft. However, there is no disclosure in Sasada et al. of a torque transducer capable of measuring torques in excess of 100 N-m which are frequently encountered in industrial drive systems, for example. Furthermore, there is no disclosure in Sasada et al. of a torque transducer which measures torque by sensing a change in the magnetic coercivity of a magnetic element.

There remains a need in the art for torque sensors which are simple, reliable, and operationally independent of electrical connection to the shaft.

SUMMARY OF THE INVENTION

The present invention provides a torque sensor and a method of sensing torque using a measurement of strain which relies on the increase of the coercive field of certain magnetostrictive, soft ferromagnetic materials upon application of stress. The torque sensor has at least one magnetic strain gage, comprising a magnetic circuit, a drive means, a sensing means and a detecting means. The magnetic circuit comprises a magnetostrictive, soft ferromagnetic element. The drive means applies a first and a second magnetomotive force to the magnetic circuit, the second magnetomotive force being directed in a direction opposite that of the first magnetomotive force. The sensing means senses the state of magnetization of the ferromagnetic element, and the detecting means determines the magnitude of magnetic field applied to the ferromagnetic element by the second magnetomotive force which reduces magnetization of the ferromagnetic element to zero.

The torque sensor of the invention is simple to construct, reliable, and capable of measuring torque in a shaft over a wide dynamic range. The torque sensor advantageously requires no electrical connection to the active sensing element, facilitating measurement of torque in a rotating shaft. Output from the sensor indicative of the torque being measured is readily obtained in digital form appointed for input directly into various computer control systems.

BRIEF DESCRIPTION OF THE DRAWINGS

The invention will be more fully understood and further advantages will become apparent when reference is made to the following detailed description and the accompanying drawings, in which.

DETAILED DESCRIPTION OF THE INVENTION

Figure 1:
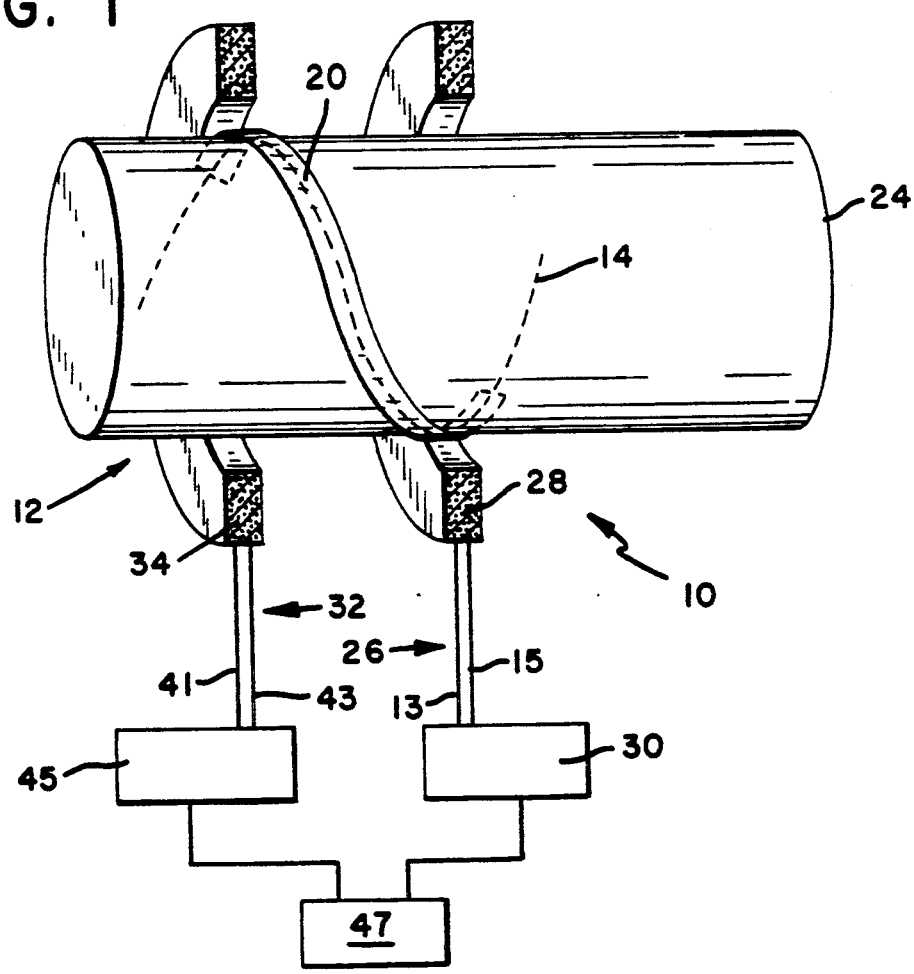
FIG. 1 is a torque sensor of the invention comprising a single magnetic strain gage.

The magnetic strain gage relies on the sensitivity of the magnetic properties of certain magnetostrictive, soft ferromagnetic materials to stress. Generally stated, the magnetic strain gage comprises:

(a) a magnetic circuit comprising a magnetostrictive, soft ferromagnetric element;

(b) drive means for applying a first and a second magnetomagnetic force to the magnetic circuit, the second magnetomotive force having a sense opposite that of the first magnetomotive force;

(c) sensing means for sensing the state of magnetization of the magnetostrictive, soft ferromagnetic element; and (d) detecting means for determining the magnitude of that magnetic field applied to the magnetostrictive, soft ferromagnetic element by the second magnetomotive force which reduces the magnetization of the magnetostrictive, soft ferromagnetic element to zero. It has been found that the coercive field of materials adapted to be used as the magnetostrictive, soft ferromagnetic element of the strain gage has an approximately linear relation to the stress applied to the material.

A magnetic circuit is a structure comprising at least one element of ferromagnetic material, the circuit directing and shaping the paths of magnetic flux. The simplest such circuit is a single piece of magnetic material such that the flux lines emerging from the material either terminate at external magnetic poles or close through free space. More complicated magnetic circuits involve a plurality of pieces of magnetic material, with the flux lines traversing the air gaps separating the various pieces. Magnetomotive forces may be applied to a magnetic circuit either by incorporating permanent magnets in the circuit or by imposing magnetic fields produced by the flow of electrical current through windings. For the latter, windings are generally disposed to encircle at least one of the elements of the magnetic circuit.

The magnetic reluctance of a magnetic circuit is a measure of the difficulty of causing a magnetic flux to traverse the circuit. The reluctance of a circuit is dependent both on the inherent magnetic properties of the materials used for the elements of the circuit and on the geometrical configuration of those elements. Materials for use in the magnetic circuit of the invention should have high permeabilities to minimize reluctance. The geometrical configuration should be such as to minimize the demagnetizing fields of the circuit. If the magnetostrictive, soft ferromagnetic sensing element of the strain gage is subjected to demagnetizing fields, its B-H loop will be sheared in a manner known in the art. A material having a sheared B-H loop exhibits transitions between the positively and negatively magnetized states which are less abrupt than those characteristic of a material with a non-sheared loop. The resulting voltage pulses induced in secondary coils during operation of the strain gage are broader, making it more difficult to time accurately the peaks of the voltage waveform, thereby reducing the resolution and sensitivity of the strain gage. A magnetic material having a sheared B-H loop also must be driven by a higher magnetic field to insure full alignment of the magnetization within the material, thus necessitating use of more complicated drive means.

The torque sensor and method for measurement of torque of present invention comprise at least one such magnetic strain gage. The magnetostrictive, soft ferromagnetic element of the magnetic strain gage is advantageously affixed to the shaft. Preferably the torque sensor comprises a first magnetic strain gage adapted for measurement of strain along a first helical direction and a second magnetic strain gage adapted for measurement of strain along a second helical direction having a chirality opposite that of the first helical direction. More preferably, the first helical direction is a 45° helix and the second helical direction is a 45° helix of opposite chirality. The torque sensor of the invention may be employed for measuring torque in a shaft which is either stationary or rotating. The apparatus for measuring torque of the invention preferably does not require any electrical connection between the shaft and external apparatus.

A preferred class of magnetic circuit for use in the strain gage consists of magnetic circuits with a single simply connected, elongated element. An elongated body is one having a long dimension much longer than either of the dimensions in the directions orthogonal to the long dimension. Preferably, the longest dimension is at least about 20 times, and more preferably, at least about 100-1000 times the square root of the cross-sectional area of the body, the cross section being taken through a plane perpendicular to the longest dimension. These requirements on the geometry of the magnetic element insure that the element have a small or negligible demagnetizing factor along the long dimension. For use in the strain gage of the invention, the elongated magnetic element should be mounted with its long dimension along the axis on which it is desired to measure strain.

Referring to the drawing of FIG. 1, there is illustrated one form of a torque sensor 10, which comprises a single magnetic strain gage 12. The embodiment illustrated in FIG. 1 is particularly adapted for the measurement of torque of a single sense. Strain gage 12 is adapted to measure strain along a helical direction 14. Magnetostrictive, soft ferromagnetic element 20 of strain gage 12 is affixed to shaft 24. Drive means 26 comprises a drive coil 28 encircling shaft 24. Drive coil 28 is connected by electrical leads 13 and 15 to supply means 30 for causing a cyclical, alternating current to flow through drive coil 28. Sensing means 32 of strain gage 12 comprises a sense coil 34 wound encircling shaft 24. Sense coil 34 is electrically connected by leads 41 and 43 to peak detecting means 45. Timing means 47 is electrically connected both to supply means 30 and to peak detecting means 45. Timing means 47 senses the difference in time (relative to the waveform of current from supply means 30) for occurrence of voltage peaks detected by peak detection means 45 caused by differences in the strain to which gage 12 is subjected, the difference in strain being caused, in turn, by the subjection of shaft 24 to torque.

Figure 2:
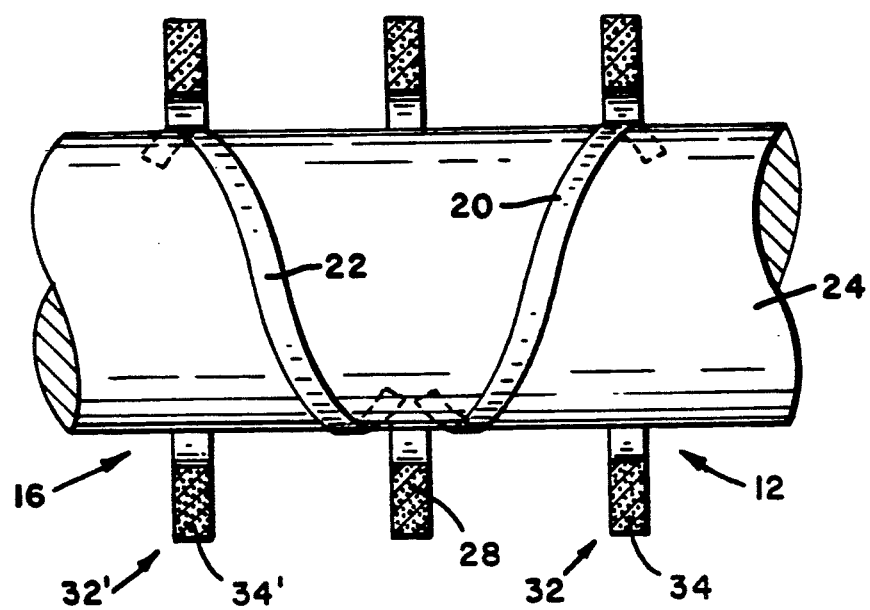
FIG. 2 is a torque sensor of the invention employing an electromagnetic drive coil excitation.

In the embodiment of FIG. 2, peak detecting means 45 is connected to both of sense coils 34 and 34'. The magnetostrictive soft ferromagnetic elements 20 and 22 of strain gages 12 and 16, respectively, are subjected to magnetic fields which are substantially equal in magnitude at each instant in time. Hence, a stress-induced difference between the coercive fields of elements 20 and 22 will result in a difference between times at which each of elements 20 and 22 is subjected to its respective coercive field and the corresponding times at which voltage peaks occur in respective sense coils 34 and 34'. Timing means 47 senses the difference in time between the respective occurrence of peaks in sense coils 34 and 34' as indicative of the difference in strain to which gages 12 and 16 are subjected.

Figure 4:
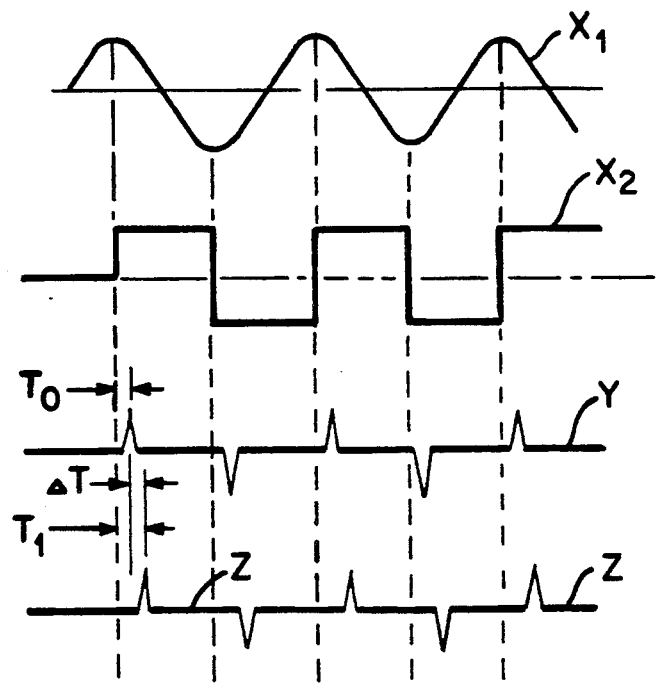
FIG. 4 is a graph showing input and output pulses of a magnetic strain gage used in the invention.

In operation, the supply means 30 of FIG. 1 sends an electric current to drive coil 28, thereby producing a changing magnetic field around drive coil 28 initiating the reversal of the orientation of the magnetization within element 20. Simultaneously with the initiation of the magnetic pulse, the digital counter within timing means 47 is turned on. As the magnetic domains within element 20 flip, the changing magnetic flux causes sense coil 34 to produce an output voltage pulse. This output voltage pulse is sent to timing means 47 stops the digital counter. The time interval captured within timing means 47 is retained and provides the digital output signal. FIG. 4 diagrammatically illustrates this sequence. The top two lines $X_1$, $X_2$ in FIG. 4 illustrate the electric current waveform generated by supply means 30 of FIG. 1 as shown. This may be either a sinusoidal wave $X_1$ or a square wave $X_2$. The line Y of FIG. 4 shows the output voltage pulse wave induced by the flipping magnetic domains proximate to sense coil 34 when element 20 is not under stress. There is a discrete time interval $T_0$ between the time at which the electric current pulses $X_1$ or $X_2$ of the top lines initiate the magnetization reversal and the time at which the rate of change of magnetization in element 20 is maximal, coincident with the voltage peaks of wave form Y. The bottom line Z of FIG. 4 shows the effect of strain within the element 20 and illustrates the increase in the discrete time interval to $T_1$ between when the electric current pulses in drive coil 28 couple enough magnetic force to flip the magnetic domains within element 20 and induce a voltage pulse within sense coil 34. The time differential $\Delta T$ between $T_0$ and $T_1$, as shown by the differences between the pulses on the line Y and the bottom line Z, is used as the measurement of the strain within the element 20, and hence $\Delta T$ can be used to determine the strain at the surface of shaft 24 to which the element 20 is attached.

Figure 5:
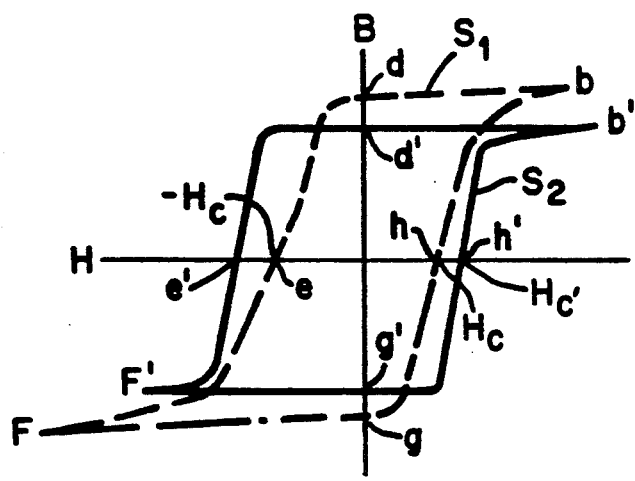
FIG. 5 is a hysteresis curve for a ferromagnetic material showing the effect of applied stress.

The change in magnetization force (H) which is required to initiate the domain reversal in element 29 may best be understood with reference to the microscopic properties of ferromagnetic materials, and the magnetic hysteresis curves as shown in FIG. 5, wherein the H axis represents the magnetizing force and the B axis represents the flux density. B and H are further related to the internal magnetization M of the material by the relation $B = H + 4M \pi$. Within ferromagnetic materials, (also sometimes referred to as simply, magnetic materials), there is a coupling between the internal magnetization of the material (a vector quantity) and the mechanical state of the material, which reflects, inter alia, any stresses applied to the material. A variety of associated phenomena are known as magnetostriction. If the magnetization direction within a magnetic sample is changed then the sample undergoes changes in its physical dimensions. For example, if a magnetic material is taken from an initial state, in which its magnetization is randomly distributed, to a final state, in which its magnetization is entirely directed along a given direction, then the sample's length along that direction changes by a fractional amount known as the saturation magnetostriction ($\lambda_s$). The value of $\lambda_s$ can be either positive or negative; typical magnitudes of $\lambda_s$ for the transition metals (Fe, Ni, and Co) are of the order $-10$ to 50 parts per million (ppm); for rare earth transition metal alloys, $\lambda_s$ can be as large as 2000 ppm. $\lambda_s$ provides a measure of the strength of the magnetoelastic coupling.

For materials having non-zero values of $\lambda_s$, the application of a uniaxial stress $\sigma$ gives rise to a magnetoelastic anisotropy energy per unit volume $K_s = \sigma \lambda_s \cos^2 \theta$ where $\theta$ is the angle between the axis of the stress and the magnetization direction is determined by an energy balance among the various sources of magnetic anisotropy and the dipolar energy M·H, where H is the applied field and M is the magnetization. In addition to magnetoelastic anisotropy, there are other sources of anisotropy: magnetocrystalline anisotropy, shape anisotropy, and field induced anisotropy. For materials having $\lambda_s > 0$ which are placed in tension, the magnetoelastic anisotropy contribution makes it energetically favorable for the magnetization to align with the tensile axis. For application in magnetic strain gages, the greatest linearity is presumed to be achieved by selection of materials in which the magnetoelastic contributions to the total anisotropy energy dominates the contributions from the magnetocrystalline and field-induced anisotropy energies. For sensitivity at low strain levels, it is preferred that the magnetic material have low magnetocrystalline and field-induced anisotropy. This requirement is normally satisfied by so-called soft magnetic materials, i.e. those having low values of magnetic coercive field $H_c$.

Suitable magnetic materials for the present invention are soft magnetic materials which are magnetostrictive, preferably those having $\lambda_s > 10$ ppm. A preferred class of magnetic materials to be employed in the present invention is the class of magnetic amorphous metals, which are also known as glassy metals or metallic glasses. Such materials exhibit metallic electrical and thermal conductivity, and x-ray diffraction patterns like those of oxide glasses, having broad halos instead of the sharp peaks seen in crystalline materials. Among the magnetic amorphous metals are materials having the general formulas $M_a Y_b Z_c$ and $M_d Y_e$, which are disclosed by U.S. Pat. No. 3,856,513 issued to Chen et al. A variety of techniques are know in the art for producing these materials in the form of wires, ribbons, and thin films. In general, the materials are formed by rapidly quenching the alloy from the melt at rates of at least $10^{4°}$ C./s, and more preferably, of at least $10^{6°}$ C./s. Alternatively, the materials are formed by atomistic deposition processes such as evaporation and sputtering.

Ferromagnetic amorphous metals exhibit a desirable combination of negligible magnetocrystalline anisotropy, low magnetic coercivity, and high hardness and tensile strength. The high strength and hardness are especially valuable for the present application. Most conventional crystalline soft magnetic materials which have low anisotropy also have low hardness and tensile strength. They are thus prone to plastic deformation at comparatively low strain levels. In contrast, many amorphous materials show a reversible stress-strain behavior at up to 100 ksi stress. Suitable amorphous materials are thus useful for application in strain gages requiring a stable, reproducible zero strain state and high upper strain limit.

The hysteresis curves of FIG. 5 are shown as representing the magnetic hysteresis loop for ferromagnetic material. In the case of an amorphous iron-based alloy the hysteresis loop is characterized as having a steep slope at its intersection with the H axis. The curve indicated by S1, i.e. bdefghb, is an example of the hysteresis loop for an amorphous metal which is not under any stress or strain, and which for example, would produce the output pulse as illustrated by the center line Y of FIG. 4. Curve S2, i.e. b'd'e'f'h'b', shows a hysteresis loop for the same amorphous iron-based alloy iron when a strain is applied to the alloy, and which would produce the output pulse illustrated by the bottom line Z of FIG. 4. Since the highest slopes on the B-H loop exist at the intersection of the H axis, it is at this point that dB/dt, which is proportional to the induced voltage, is maximum, causing the sharp output pulses of both polarities produced within the sense coil 34.

As discussed above, strain causes a change in the magnetic behavior of magnetostrictive material, which results in the distortion of the hysteresis loop under an applied strain. This distortion generally causes an increase in the width of the hysteresis loop with reference to the H axis. Within the hysteresis loops, for curve S1, $H_c$ and for curve S2, $H_c'$, represent the magnetizing force at the positive crossing point for curves S1 and S2 on the H axis. The changes between curve S1 and S2 as a function of applied stress or strain is related to the change in magnetization force required to produce a change in the flux density B in element 20 when element 20 is under a no-load condition and when element 20 is subjected to a stress load. This generally is the phenomenon upon which the magnetic strain gage used in the present invention is based.

It is generally found that the B-H loop of a soft ferromagnetic material is steepest at the points where the loop crosses the H-axis, i.e., at the coercive points at which $H = + - H_c$. If H is varied periodically in time so as to traverse the entire B-H loop smoothly, then the waveform of the time rate of change of B (i.e., the wave form of dB/dt) will exhibit peaks of positive and negative polarities at those times at which H attains values of the plus and minus the coercive field $H_c$, respectively. The wave form of dB/dt can easily be detected by measuring the voltage induced in a sensing coil encircling the magnetic material. By Faraday's law of induction, the instantaneous induced voltage is directly proportional to the instantaneous dB/dt. It is convenient to choose a cyclic, alternating waveform for the field H(t) in which the slope of H(t) changes only twice per period. Suitable choices for H(t) include sine, triangular, and sawtooth waveforms. H(t) is conveniently applied by causing an electrical current having the waveform desired to pass through a winding encircling the magnetic material, since instantaneous current and field are proportional. H(t) may be applied continuously or in a burst of a finite number of cycles. The latter is preferred when it is desired to limit the heat produced by joule heating of the current-carrying windings.

The electric current generated by supply means 30 of FIG. 1 should be of sufficient magnitude to produce a magnetomotive force which results in a peak field with strength sufficient to saturate the magnetization within element 20. It is presently believed that all of the magnetic domains in the element 20 tend to orientate or flip simultaneously, with only small local variations. Increasing the stress within element 20 increases the field strength (H) required to flip or realign the magnetic domains in the directions of H. This realignment must follow the hysteresis loop, which, as has been described, changes with an applied stress or strain. The time required for the magnetic domains to flip is directly linked to the distortion of the hysteresis loop since H is coupled to element 20 as a function of time. In effect the magnetic strain gage measures the increase in time necessary to supply the additional magnetizing force to produce a maximum percentage of magnetic domain realignments.

Referring to the drawing of FIG. 1, there is illustrated one form of a torque sensor 10. Within FIGS. 1-3, common elements will be denoted by the same numbers. For simplicity certain elements shown in FIG. 1 will be omitted in FIGS. 2-3. In this embodiment the torque sensor 10 comprises two magnetic strain gages, a first magnetic strain gage 12 adapted for measurement of strain along a first helical direction 14 and a second magnetic strain gage 16 adapted for measurement of strain along a second helical direction 18 having chirality opposite to that of the first helical direction 14. The magnetostrictive, soft ferromagnetic elements 20 and 22, respectively, of each of the first and the second magnetic strain gages 12 and 16 are affixed to shaft 24. The first and second magnetic strain gages share a common drive means 26 comprising a drive coil 28 wound encircling shaft 24 and means 30 for causing a cyclic, alternating electrical current to flow through drive coil 28. The sensing means, 32 and 32', respectively, for each strain gage comprises a sense coil 34 and 34' wound encircling shaft 24. For measurement of torque in a non-rotating shaft, drive coil 28 and sense coils 34 and 34' may be wound directly on the shaft. For applications which require the measurement of torque in a rotating shaft, drive coil 28 and sense coils 34 should be mounted rotatably independent of the shaft to eliminate the need for electrical connection to the shaft.

Figure 3:
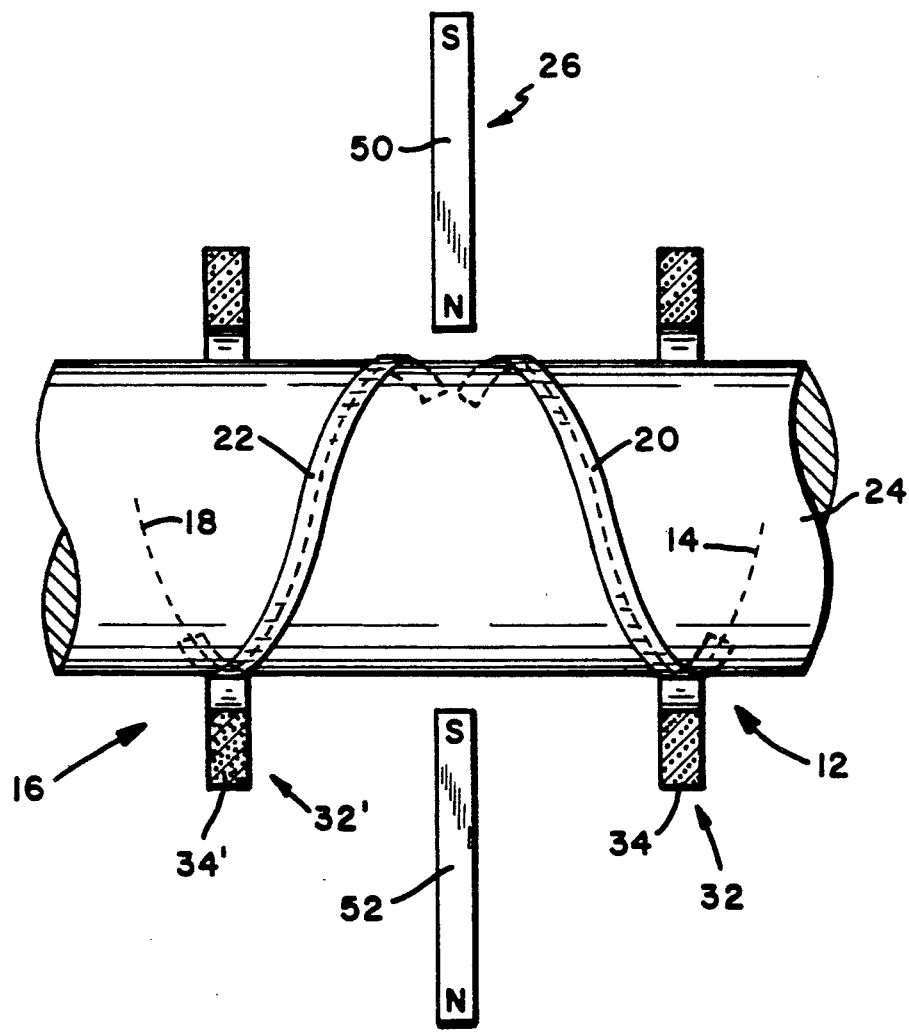
FIG. 3 is a torque sensor of the invention employing permanent magnet excitation.

Another embodiment of the apparatus for measuring torque adapted for use with a rotating shaft 24 is illustrated in FIG. 3. This embodiment again comprises two magnetic strain gages, a first magnetic strain gage 12 adapted for measurement of strain along a first helical direction 14 and a second magnetic strain gage 16 adapted for measurement of strain along a second helical direction 18 having chirality opposite to that of the first helical direction 14. The magnetostrictive, soft ferromagnetic elements 20 and 22, respectively, of each of the first and the second magnetic strain gages 12 and 16 are affixed to shaft 24. The first and second magnetic strain gages 12 and 16 share a common drive means 26 comprising a first permanent magnet 50 and a second permanent magnet 52. The first and the second permanent magnets 50 and 52 are disposed diametrically opposite each other across shaft 24. First permanent magnet 50 has its north magnetic pole located proximate to shaft 24 and second permanent magnet 52 has its south magnetic pole proximate to shaft 24. As shaft 24 rotates relative to permanent magnets 50 and 52, an end of each of the magnetostrictive, soft ferromagnetic elements 20 and 22 passes proximate to first permanent magnet 50 and second permanent magnet 52 sequentially. When each magnetic element passes proximate to first permanent magnet 50 a magnetomotive force is progressively applied, bringing the element first to magnetic saturation, then to remanence. As each magnetic element then approaches proximate to second permanent magnet 52, an oppositely directed magnetomotive force of increasing strength is then applied. At the point at which the magnetomotive force imposes on each magnetic element a magnetic field having a strength equal to the coercive field of each respective magnetic element, the net magnetization of the magnetic element is reduced to zero. Each of the first and second magnetic strain gages 12 and 16 comprises a sense coil 34 proximate to, and preferably surrounding, shaft 24. A voltage is induced in each of sense coils 34 and 34' corresponding to a change in the magnetization of the associated magnetic element, the voltage reaching a peak at the time at which the magnetization reverses and the imposed magnetic field is equal to the element's coercive field. By sensing changes in the relative phase of the induced voltage peaks detected in the respective sense coils 34 and 34', changes in the coercive fields of the magnetic elements 20 and 22 can be sensed. In this embodiment the phase of the induced voltage peaks should be measured relative to the rotational position of the shaft which can be sensed by means known in the art, such as optical encoders and magnetic position encoders.

The embodiment depicted in FIG. 3 can also be practiced using any even number of permanent magnets symmetrically disposed about shaft 24, the permanent magnets having alternating north and south magnetic poles proximate to shaft 24. In a most preferred embodiment, the torque sensor comprises two magnetic strain gages. The magnetostrictive, soft ferromagnetic elements of the two gages are substantially identical amorphous metal ribbons or wires which are affixed synmetrically to the shaft along helices of +45° and −45°. The starting ends of the elements are located substantially at the same polar angle. A single drive coil, encircling the shaft, is located midway between the starting ends of the elements. Two substantially identical sense coils encircling the shaft are disposed near the ends of the elements and are located equidistant from the drive coil. A cyclic, alternating current passed through the drive coil produces substantially identical magnetic fields in the two elements. A difference in the phase of the voltage pulses induced in the sense coils is thereby indicative of a difference in strain along the helices, and thus of the torque imparted to the shaft.

While not being bound by any theory, it is believed at this time by the inventor that the coercivity of magnetostrictive materials having positive saturation magnetostriction is affected principally by tensile stresses and only to a lesser extent by compressive stresses. It is likewise believed that the coercivity of materials having a negative saturation magnetostriction is affected principally by compressive stresses. Hence, a greater shift in phase is to be expected for the strain gage undergoing tensile stress than for the strain gage in compressive stress, both gages employing positive magnetostriction material. Likewise, a lesser shift in phase is to be expected for the strain gage undergoing tensile stress than for the strain gage in compressive stress, both gages employing negative magnetostriction material.

Having thus described the invention in rather full detail, it will be understood that this detail need not be strictly adhered to but that various changes and modifications may suggest themselves to one skilled in the art, all falling within the scope of the present invention as defined by the subjoined claims.

What is claimed is:

1. A method for measurement of torque in a shaft, comprising:
   (a) attaching at least one magnetic circuit to said shaft, said magnetic circuit comprising a magnetostrictive, soft ferromagnetic element; and
   (b) sensing a change in the coercive field of said ferromagnetic element caused by torque in said shaft.

2. A method for measurement of torque in a shaft comprising:
   (a) attaching a first magnetic strain gage and a second magnetic strain gage to said shaft, said first and second magnetic strain gages comprising respectively, first and second sense coils and first and second magnetostrictive, soft ferromagnetic elements and being operative to sense a change in the coercive field of said ferromagnetic elements, said first magnetic strain gage being operative to measure strain along a first helical direction of said shaft and said second magnetic strain gage being operative to measure strain along a second helical direction of said shaft having chirality opposite to that of said first helical direction; and
   (b) measuring the strains indicated by said first and said second magnetic strain gages by subjecting each of said first and second ferromagnetic elements to cyclic alternating magnetic fields having substantially equal magnitudes at each of said first and second ferromagnetic elements and sensing the difference in phase of the voltage peaks induced in said first and second sense coils.

* * * * *